UNITED STATES PATENT OFFICE.

ROBERT WAHL AND ARNOLD S. WAHL, OF CHICAGO, ILLINOIS.

ART OF PREPARING FOODS FOR COOKING.

1,191,047.   Specification of Letters Patent.   Patented July 11, 1916.

No Drawing.   Application filed January 16, 1915.   Serial No. 2,546.

*To all whom it may concern:*

Be it known that we, ROBERT WAHL and ARNOLD S. WAHL, citizens of the United States, residing at Chicago, in the county of Cook and State of Illinois, have invented a new and useful Improvement in the Art of Preparing Foods for Cooking, of which the following is a specification.

Our invention relates to an improvement in the art of preparing foods, generally, which contain as nutrient bases nitrogenous substances and phosphates, and including bakers' products, such as bread, rolls, buns, cakes, soda-biscuits and unaerated breads, meats, potatoes, and toasted cereal foods, such as wheat and corn flakes. We have discovered that by treating such foods, before cooking them (including heating, baking, roasting, parching, and the like), with lactic acid liquor free from material quantities of ferment-products deleterious to the food, and particularly when containing, besides the acid, the unassimilated remnants and other fermented and unfermentable extractive substances of the material from which the liquor was produced the product is rendered superior in a number of particulars. For example, in the art of bread-making, among the more important particulars of superiority afforded by adding this lactic acid to the ingredients mixed together for producing yeast-raised dough, the following may be mentioned: The appearance of the crust is improved in color and bloom; the crumb is improved in uniformity of texture and color, besides attaining greater whiteness in white bread; a larger size of loaf results per weight of bread; a more uniform distribution of gas-cells is obtained resulting in smaller cells in augmented number in the crumb with avoidance of holes or, at least, with material decrease in their size, and a less crumbly and less doughy but more velvety crumb; a finer flavor of the bread is produced because of the avoidance of obnoxious odors from development of foreign ferments, as also an augmented palatableness by a change ensuing in the tribasic phosphates, which impart an alkaline taste, into acid phosphates, which lend zest and appetizing qualities to the bread; and the product is rendered more wholesome, by reason of being more readily digestible.

The lactic acid used is that prepared as a sour liquid according to Letters Patent of the United States No. 1,028,508, dated June 4, 1912, though its content of the acid should not exceed about 1 per cent., and is preferably about ¾ of 1 per cent.; and in that connection it is recommended that wheat-bran be used as the base, since it is a cheap by-product and contains both proteins and basic phosphates locked up in the cellulose of the bran, but which is made available by the action of the lactic acid. To produce this sour liquid, a mash or mixture of bran and water is made, using, by weight, about 20 to 50 parts of bran with about 15 to 25 parts of sugar to about 1000 parts of water. This mash is heated to 55° C., or thereabout, and is then inoculated with lactic acid bacteria, preferably by adding a portion of an acidulated mash previously produced in the same manner. After inoculation, the mash is held at a temperature of between 55° C., to 45° C., or thereabout, until the desired extent of acidulation is obtained. About 40 to 70 parts of this acidulated liquor are added in mixing the materials for the dough, including flour, water, yeast, salt, and other ingredients if desired, the proportion of the added liquor to the flour being about at 1 to 7. The lactic acid liquor may, however, be produced from wheat-flour, fresh, stale or defective bread, or other suitable material. By adding the acid in a thus already formed condition, the desirable results hereinbefore mentioned are immediately produced by the action of the acid in making and baking the bread. The acid acts to liberate and activate the proteolytic enzyms contained in the flour, and effects solution of the basic phosphates in the latter, besides itself acting enzymatically in splitting up the insoluble proteins into soluble peptones and amino bodies. These, together with the soluble phosphates, provide the food required by the yeast to build up its protoplasm, much of the required yeast-food being contained in the flour in an unassimilable because insoluble condition, but which the lactic acid transforms and makes soluble and assimilable.

The acidulation does not become markedly noticeable, either to the taste or otherwise, because the lactic acid is in turn neutralized by the alkali of the basic phosphate, and the potassium, calcium and magnesium phosphates, which are present as bases, are, in turn, changed from basic into acid phosphates. Moreover, the acid, be it the added lactic acid or the acid phosphate produced, has a general retarding influence on foreign ferments, growth of which would tend to produce bad odor, discoloration, ropiness and sourness in the bread. It is also to be noted that the production of yeast-food by the effect of the lactic acid on the phosphates and on the protein aided by proteolytic enzyms, whether set free or not, has marked stimulating and invigorating effect on the yeast, whereby the latter is caused to produce, within a given time, a larger amount of carbonic acid gas, so that in the period of making bread up to the time of "knocking down," as well as in the "proofing," the gas generated is in dependably large quantity; the other factor being vigor of the yeast. The increased nourishment afforded to the yeast, with its resultant invigoration, produces increased yeast growth and a consequent tendency to separate the yeast into individual cells and avoid cell-aggregations; whereas, if the individual yeast-cells comprising them be undisturbed or insufficiently nourished, they remain intact, and, through the combined action of the aggregated cells cause the production of holes in the crumb or a lack in uniformity of its texture.

The greater volume of the loaf is due to the increased distribution of the invigorated yeast-cells combined with the larger number formed of the latter, so that each particle of the dough becomes, as it were, aerated, each cell being surrounded by the gluten (gliadin and glutenin) modified in the direction of greater elasticity, which principle, as is generally supposed, resides in the gliadin.

In the case of unfermented bakery goods, such as soda biscuits, aeration results from the sodium bicarbonate or carbonic acid used. Our lactic acid renders unnecessary the use of cream of tartar or other chemical having an acid base, the carbonic acid gas being, by our improvement, liberated after incorporating the soda with the dough, by mixing the lactic acid with the latter whereby not only aeration but the other desirable effects hereinbefore named are obtained, since the phosphates of the flour are changed to acid phosphates and the nitrogenous substances are transformed, in part, into peptones, thus rendering the bread more wholesome and more readily digestible, while the texture is improved, being produced of desired quality owing to uniform distribution of the soda throughout the dough. This distribution does not encounter the same difficulties as in the case of the yeast, which by reason of the mucilaginous coating on the individual yeast-cell membranes, rendering the yeast sticky, forms the non-readily dispersible cell-aggregations already referred to; while the particles of soda are readily distributed and yield readily to thorough mechanical mixing with the dough. Our improvement is also advantageously applicable to toasted foods, commonly known as breakfast foods, by steeping them, before toasting, in the lactic-acid liquor; to meats, and, in fact, to all food products or materials, prior to cooking them, that contain as nutrient bases, nitrogenous substances and phosphates, because of the effect of the lactic acid, in transforming the basic phosphates and insoluble nitrogenous substances, of enhancing the food in palatable, wholesome, digestible and appetizing qualities.

While commercial lactic acid may be used with improved results in all cases, it is preferable to use the bacterial lactic acid hereinbefore referred to on account of its greater effectiveness, since the propagated acid, with the extracted substances in it, contains a much greater concentration of hydrogen ions, upon which the effectiveness of the acid largely depends.

What we claim as new and desire to secure by Letters Patent is:—

1. As an improvement in the art of preparing for cooking food containing as nutrient bases proteids and phosphates, introducing into the food material before cooking it lactic-acid liquor substantially free from the products of other fermentations containing, besides the acid, the unassimilated remnants and other fermented and unfermentable substances of the cereal matter from which said liquor was produced, thereby transforming basic phosphates into soluble phosphates and proteids into soluble nitrogenous substances and enhancing the palatable, wholesome, digestible and appetizing qualities of the cooked food.

2. As a step in the art of bread-making, introducing into the dough, preparatory to baking it, lactic-acid liquor substantially free from the products of other fermentations containing, besides the acid, the unassimilated remnants and other fermented and unfermentable substances of the cereal matter from which said liquor was produced, thereby transforming basic phosphates into soluble phosphates and proteids into soluble nitrogenous substances and enhancing the palatable, wholesome, digestible and appetizing qualities of the bread.

ROBERT WAHL.
ARNOLD S. WAHL.

In presence of—
D. C. THORSEN,
A. C. FISCHER.